United States Patent

Nihei et al.

[11] Patent Number: 5,549,018
[45] Date of Patent: Aug. 27, 1996

[54] SMALL-LOCUS MACHINING APPARATUS

[75] Inventors: Ryo Nihei, Fujiyoshida; Akihiro Terada; Yasuo Sasaki, both of Minamitsuru-gun, all of Japan

[73] Assignee: Fanuc Ltd., Yamanashi, Japan

[21] Appl. No.: 182,068

[22] PCT Filed: Apr. 3, 1993

[86] PCT No.: PCT/JP93/00584

§ 371 Date: Jan. 13, 1994

§ 102(e) Date: Jan. 13, 1994

[87] PCT Pub. No.: WO93/24285

PCT Pub. Date: Dec. 9, 1993

[30] Foreign Application Priority Data

May 22, 1992 [JP] Japan .................... 4-154086

[51] Int. Cl.⁶ ............................................... G05G 15/00
[52] U.S. Cl. ............................................ 74/490.03; 901/23
[58] Field of Search .................... 74/490.03; 901/22, 901/23, 24

[56] References Cited

U.S. PATENT DOCUMENTS

| | | | |
|---|---|---|---|
| 4,568,238 | 2/1986 | Hirano et al. | 901/23 |
| 4,648,785 | 3/1987 | Nakagawa et al. . | |
| 4,712,971 | 12/1987 | Fyler | 901/23 |
| 4,730,975 | 3/1988 | Munakata | 901/24 |
| 4,813,846 | 3/1989 | Helms | 901/23 |
| 4,874,286 | 10/1989 | Koster et al. | 901/23 |
| 5,077,510 | 12/1991 | Collie | 901/22 |
| 5,107,719 | 4/1992 | Kota . | |
| 5,245,263 | 9/1993 | Tsai et al. | 901/22 |
| 5,341,078 | 8/1994 | Torii et al. | 901/24 |

FOREIGN PATENT DOCUMENTS

| | | |
|---|---|---|
| 145007 | 6/1985 | European Pat. Off. . |
| 232930 | 8/1987 | European Pat. Off. . |
| 60-49276 | 3/1985 | Japan . |
| 62-19389 | 1/1987 | Japan . |
| 63-150177 | 6/1988 | Japan . |
| 2060556 | 5/1981 | United Kingdom . |

Primary Examiner—Charles A. Marmor
Assistant Examiner—David Fewstermacher
Attorney, Agent, or Firm—Staas & Halsey

[57] ABSTRACT

A small-locus machining apparatus is attached to the distal end of a wrist of a robot but operable independently of a robot body. First and second drives of the apparatus are mounted on a base in such a manner that respective output spindles are parallel with each other. First and second rotational arms are coupled to the output spindles through decelerators, which are directly connected to the drives, allowing rotation in a plane orthogonal to the output spindles. These rotational arms and links interconnecting the rotational arms constitute a link mechanism having, for example, five joints. A tool is attached to this link mechanism, and the rotational amounts of the first and second arms are detected to determine the coordinate position of the tool.

10 Claims, 6 Drawing Sheets

SMALL-LOCUS MACHINING APPARATUS

BACKGROUND OF THE INVENTION

1. Field of the Invention

The present invention relates to an apparatus mounted on a wrist of an industrial robot and intended to perform a locus control for a small-locus machining tool.

2. Description of the Prior Art

In recent years, there is an increasing demand for performing small hole machining, such as perforating option holes in an object such as an automobile body, wherein the object has gone through a bending process. It is further desired that such small hole machining is particularly performed within a line using robots.

In a small-locus machining tool for small hole machining, such as a weaving locus machining tool for arc welding or a marking operation, the locus accuracy of the tool when using a robot will be a problem, though there may arise a variety of other problems in performing such type of machining using the industrial robot. For example, in general, it is difficult to move the tool along a desired path or locus by controlling the distal end of the arm because of a larger inertia and a lower rigidity of the distal end of the robot arm on which a tool is mounted. Also, in the case of a multi-spindle robot such as a six-spindle robot, the amount of movement is determined by calculating the interpolation of the move command. Therefore, if the interpolating period in too long, the interval of the interpolation relative to the length of the locus becomes too rough, especially in the case of a small path, thereby making it difficult for the tool to accurately follow the locus as required.

Hence, the above problem has conventionally been solved by attaching a small-locus machining apparatus having a driving control to the distal end of the wrist of the robot, thereby enabling the tool to move more finely via the wrist of the robot for higher locus accuracy. FIGS. 7 to 10 illustrate examples of such a small-locus machining apparatus.

FIG. 7 is a diagram showing a a small-locus machining apparatus 3 for controlling the weaving locus in arc welding, the apparatus 3 being mounted on the distal end of the arm of a robot 1. In this small-locus machining apparatus 3, the spindles for displacing the tool along a locus are controlled by calculating the interpolation, independently of the robot body 1. The small-locus machining apparatus 3 shown in prior art FIG. 8 is controlled so that the move command is interpolated with respect to two orthogonal spindles to move the tool (marker 2) for the marking operation, independently of the operation of the robot body 1.

However, the small-locus machining apparatus using such orthogonal spindles involves the following disadvantages:

First, the combination of the robot body and the small-locus machining apparatus causes an increase in size to enlarge the interference region with the periphery, thereby increasing the load applied onto the robot body 1. For the linear spindles constituting the orthogonal spindles, it is also difficult for their lubricating sections to be sealed effectively. Regarding the first and second motors for controllably driving the first and second spindles, the second motor is mounted on the moving part which is driven by the first spindle, so that the first spindle is subjected to an increased load, which in turn makes it difficult to arrange the cables.

FIGS. 9 and 10 depict a prior art compass mechanism for describing a circular locus by using a spindle T1 for circular movement of the tool and also using a spindle T2 for radial movement in the circle formed around the spindle T1, independently of the operation of the robot body. Naturally, it is possible to cause the tool to describe any locus other than a circle by so commanding the two spindles T1 and T2. Reference marks M1 and M2 denote servomotors for driving spindle T1 and spindle T2, respectively.

However, such a compass mechanism generally entails the following disadvantages:

Gearing, which is shown as a gear 4 in FIG. 9, is used in the final speed reduction stage for transmitting the power to the spindles T1 and T2, so that, when generating a configuration other than the circular locus, it may be influenced by backlash, which may make it impossible to secure a location with predetermined accuracy.

An attempt to eliminate this backlash may cause an increase in both complication and dimension of the apparatus and may result in an increase in cost.

One step deceleration using gears inevitably requires a motor to have a higher output since a desired speed reduction ratio is not ensured. This entails an increase in the dimensions of the apparatus, as well as cost and power consumption. Also, a larger gear pitch may bring about a deterioration in the interpolation accuracy.

On the other hand, an attempt to secure a desired speed reduction ratio by employing the multi-gears may be followed by increased weight, an enlarged apparatus, accumulated backlash, and increased cost.

In the case where this compass mechanism is applied to a laser machining tool such as a small hole machining tool, the connection between the tool 2 and the optical fiber cable 5 will be confined within a rotation mechanism, which is difficult to disassemble, in the body, thus making daily maintenance work difficult for the optical system.

Similarly, in the case of an application to laser machining, the optical system passes through the inside of a movable part, which performs a double-rotation of the compass mechanism. It is however difficult to perfectly seal the lubricating part of the movable section, and thus difficult to protect the optical system from being contaminated by the lubricating part.

In the case of a compass mechanism, in order to prevent the cable 5 leading to the tool 2 from being excessively twisted by one turn of the tool 2 performing a circular locus movement, the tool 2 must be supported by, for example, a bearing 6, and a whirl-stop 7 must be provided.

It is to be appreciated that the small-locus machining apparatus including the above compass mechanism is usually provided with a control means comprising means for detecting the amount of movement, for calculating the interpolation, and for carrying out the results.

SUMMARY OF THE INVENTION

An object of the present invention is to provide a lightweight and compact small-locus machining apparatus capable of controlling a small-locus machining tool with a high accuracy, the apparatus having a structure free from contamination from a tool and being capable of preventing any physical damage to lead members such as cables, wires or hoses.

In order to accomplish the above object, the small-locus machining apparatus of the present invention comprises a base; first and second drives fastened to the base; first and second rotational arms rotatable on the same plane or on corresponding parallel planes around their respective fixed points with respect to the base by means of the first and second drives, respectively; a five-joint link structure including three intermediate joints, the structure having two coupling links intervening between the first and second rotational arms so as to form joints for rotatably connecting the rotational arms with the coupling links and for rotatably interconnecting the coupling links; a member for attaching a tool, the member being located at a point on one link of the link structure or on its extended line; a detector for detecting rotational amounts of the first and second rotational arms; and a controller for controllably setting the rotational amounts of the first and second rotational arms to predetermined amounts as required.

Preferably, the first and second drives are mounted on the base in such a manner that respective output axes are parallel to each other, permitting rotation of the first and second arms in corresponding planes orthogonal to the respective output axes.

Preferably, the small-locus machining apparatus of the present invention further comprises first and second decelerators directly connected to the first and second drives, respectively, the first and second decelerators having respective output spindles secured to the base ends of the first and second arms, respectively.

Preferably, either one of the first and second rotational arms in the five-joint link structure is so controlled that a joint connecting a distal end of one arm to one end of a coupling link always lies on the side of the rotational center of the other rotational arm, or alternatively, on the opposite side to the rotational center of the other rotational arm, with respect to a straight line joining the rotational center of the one rotational arm and a joint connecting the coupling link to another coupling link.

Preferably, the tool is attached to a joint connecting two coupling links together in such a manner that the tool is secured to one end of either one of the coupling links and is also secured, through a bearing, to one end of the other coupling link.

Preferably, the tool is secured at any position on the coupling link constituting the link structure or at any position on an extended link line obtained by extending the coupling link beyond one of the two joints defining both ends of the coupling link.

According to the present invention, as described hereinbefore, any locus of the tool is controlled by the two drives and the link structure. Hence, there is no need to incorporate the components associated with the tool into the components associated with the drives, so that the structure can be simplified for an accurate control. Also, the lead member is prevented from being excessively twisted with respect to the tool. Moreover, any whirl-stop, which may be necessary for a compass mechanism, is not required, thereby preventing interference by the whirl-stop.

Use of the decelerators enables the apparatus to be driven by a motor of a lower output. Furthermore, the decelerators, directly connected to the outputs of the drive motor without interposing gears therebetween, contribute to a smaller backlash and a higher rigidity, thereby enabling a small-locus machining tool to operate at a higher accuracy.

A small-sized servomotor available on the market is used for controlling the spindles, and the decelerator can also be a unit available on the market, which will contribute to a lower production cost.

Since the tool is separated from a contaminating source such as a lubricating part of the drive section, the optical system, including those for laser machining, is free from any contamination. In addition, such structure provides easy attachment or detachment of the optical fibers or the tool, thereby facilitating ordinary maintenance work for the optical system.

Moreover, the entire structure of the driving section can substantially be reduced in size, as compared with conventional driving sections.

Since the drives such as the motors or decelerators are all fixed to the base of the small-locus machining apparatus, each of such components will not act on the others as a load. This results in lessened inertia of the movable parts such as the links of the small-locus machining apparatus to improve the controllability. And, since the drives are stationary, the cable or the like can easily be arranged around the drives.

The small-locus machining apparatus can be made compact by folding inside the five-joint link structure.

Thus, there can be realized a sharing of the component parts, saving of space, and a reduction in size and cost.

The lubricating part of the driving section can easily be sealed with a O-ring or oil seal, thereby preventing any leakage of lubricant or the like. Thus, in addition to the function and effect described above, the tool can be prevented from being contaminated.

DESCRIPTION OF THE PREFERRED EMBODIMENTS

Figure 1:
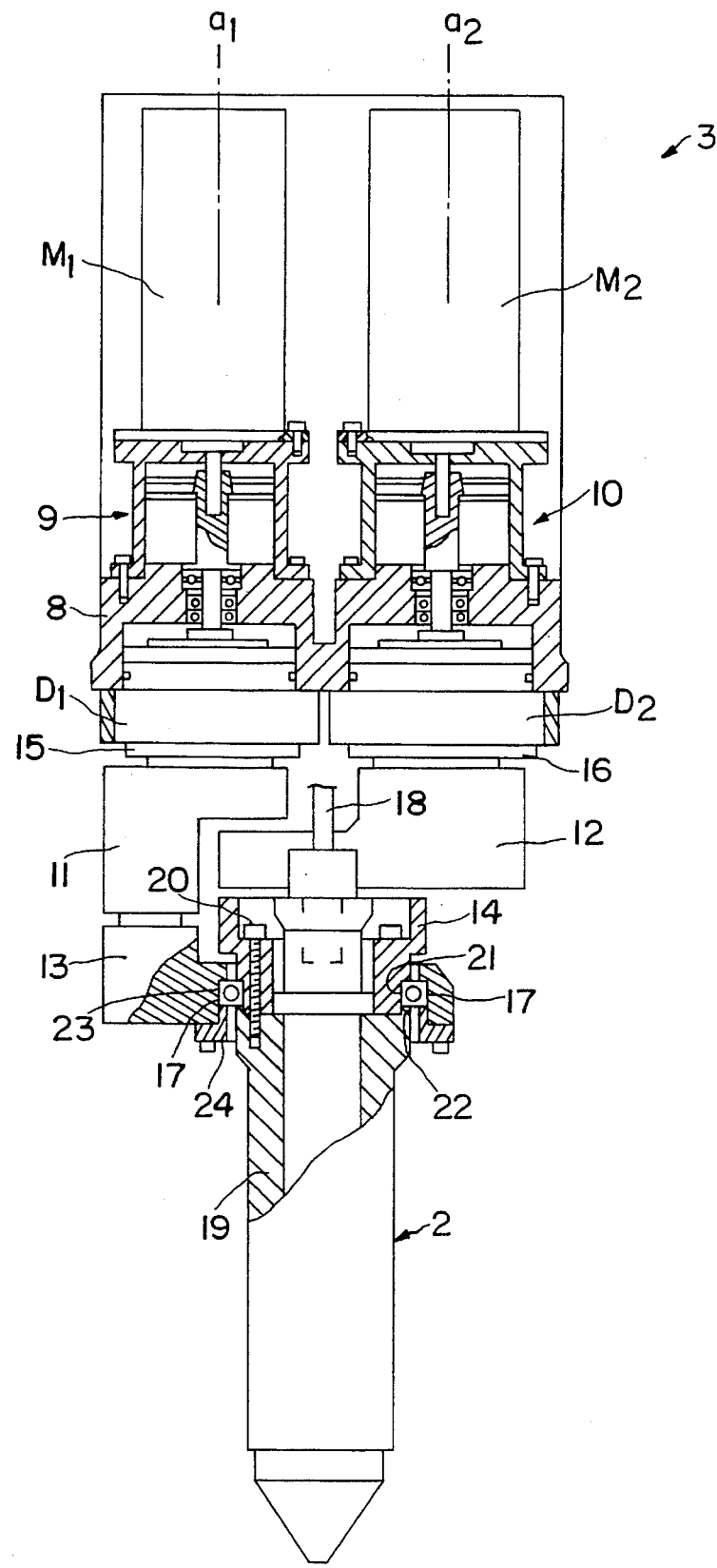
FIG. 1 is a front elevational view, partly in section, of a small-locus machining apparatus constructed in accordance with an embodiment of the present invention.
Figure 2:
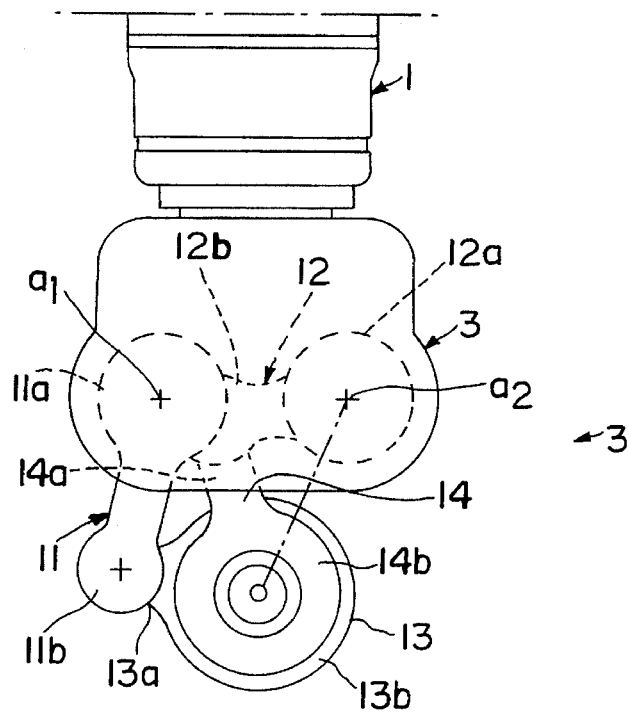
FIG. 2 is a top plan view showing the small-locus machining apparatus of FIG. 1 being attached to the distal end of a robot arm.
Figure 3:
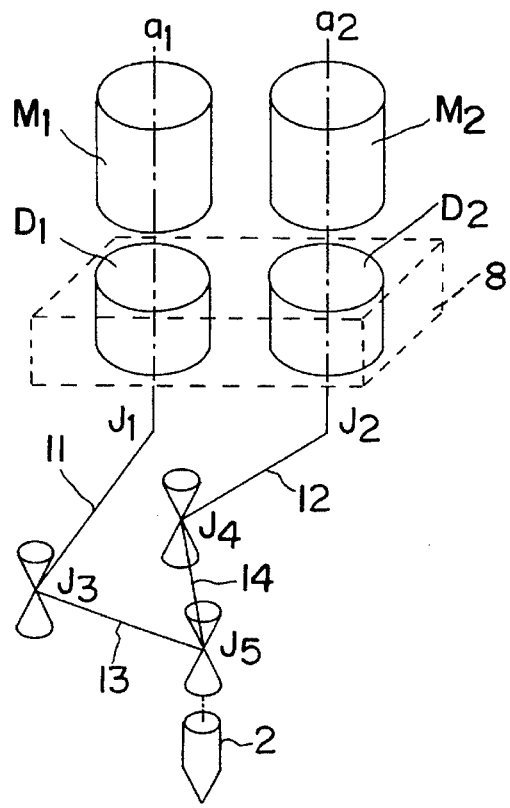
FIG. 3 is a mechanistic diagram schematically showing the mechanism of the small-locus machining apparatus of FIG. 1.

FIGS. 1 through 3 illustrate an embodiment of a small-locus machining apparatus 3 constructed in accordance with the present invention. The small-locus machining apparatus 3 is mounted on a distal end of a wrist of a robot body 1. The small-locus machining apparatus 3, as shown in FIG. 1, comprises a base 8, a first drive 9, a second drive 10, a first arm 11, a second arm 12, a first link 13, a second link 14, and a tool 2. The first drive 9 and the second drive 10 are secured to the base 8 in such a manner that respective output axes a1 and a2 are parallel to and, as long as the structure permits, in close proximity to each other. The first drive 9 includes a first servomotor M1 and a first speed reducer or decelerator D1, while the second drive 10 includes a second servomotor M2 and a second decelerator D2. Output spindles of the first and second servomotors M1 and M2 are coupled to input spindles of the first and second decelerators D1 and D2, respectively. The servomotors M1 and M2 are under the control of a control means, which is not shown, for setting the rotation of the first arm 11 and the second arm 12 to respectively predetermined amounts.

As shown in FIG. 2, a base 11a of the first arm 11 is fastened to an output spindle 15 of the first decelerator D1, and a base 12a of the second arm 12 is fastened to an output spindle 16 of the second decelerator D2. The arms 11 and 12 are allowed to rotate in a plane orthogonal to the output axes a1 and a2 such that they overlap. Similarly, a base 13a of the first link 13 is coupled to the other end 11b of the first arm 11 so as to be rotatable in a plane orthogonal to the output axes a1 and a2, similarly. A base 14a of the second link 14 is rotatably coupled to the other end 12b of the second arm 12. Moreover, the other end 13b of the first link 13 and the other end 14b of the second link 14 are rotatably coupled together. The above construction forms a linking structure having five joints as a whole including the base 8.

FIG. 3 is a mechanistic diagram of this link structure, in which a first joint J1 represents a juncture between the output spindle 15 of the first decelerator D1 and the base 11a of the first arm 11, a second joint J2 represents a juncture between the output spindle 16 of the second decelerator D2 and the base 12a of the second arm 12, a third joint J3 represents a juncture between the other end 11b of the first arm 11 and the base 13a of the first link 13, a fourth joint J4 represents a juncture between the other end 12b of the second arm 12 and the base 14a of the second link 14, and a fifth joint J5 represents a juncture between the other end 13b of the first link 13 and the other end 14b of the second link 14.

The third to fifth joints J3 to J5 are intermediate joints whose positions vary during operation and whose associated links are coupled together by way of respective radial bearings 17 (see FIG. 1) in such a manner as to permit light and smooth rotation. It is to be noted that the length and motion range of the arms 11, 12 and the links 13, 14 are set so that the fourth intermediate joint J4 is always positioned inside a line joining the joints J2 and J5, that is, on the side of the joint J1.

The tool 2 is a head for laser machining, to which there is connected an optical fiber cable 18 as a lead member. The tool 2 is attached to the fifth joint J5, sharing a part of its component with the intermediate joint structure.

More specifically, a tool body 19 of the tool 2, at its upper end, is fixedly mounted to the other end 14b of the second link 14 in the intermediate joint J5 by means of a bolt 20. This attachment, as shown in FIG. 1, is firmly carried out by pressing an inner ring 21 of the radial bearing 17 intervening between the other end 13b of the first link 13 and the other end 14b of the second link 14, constituting the joint J5, by a flange 22 provided on the upper end of the tool body 19. Besides, an outer ring 23 of the bearing 17 is fixed by a bearing presser 24, which is externally fitted into the other end 13b of the second link 13.

Figure 4:
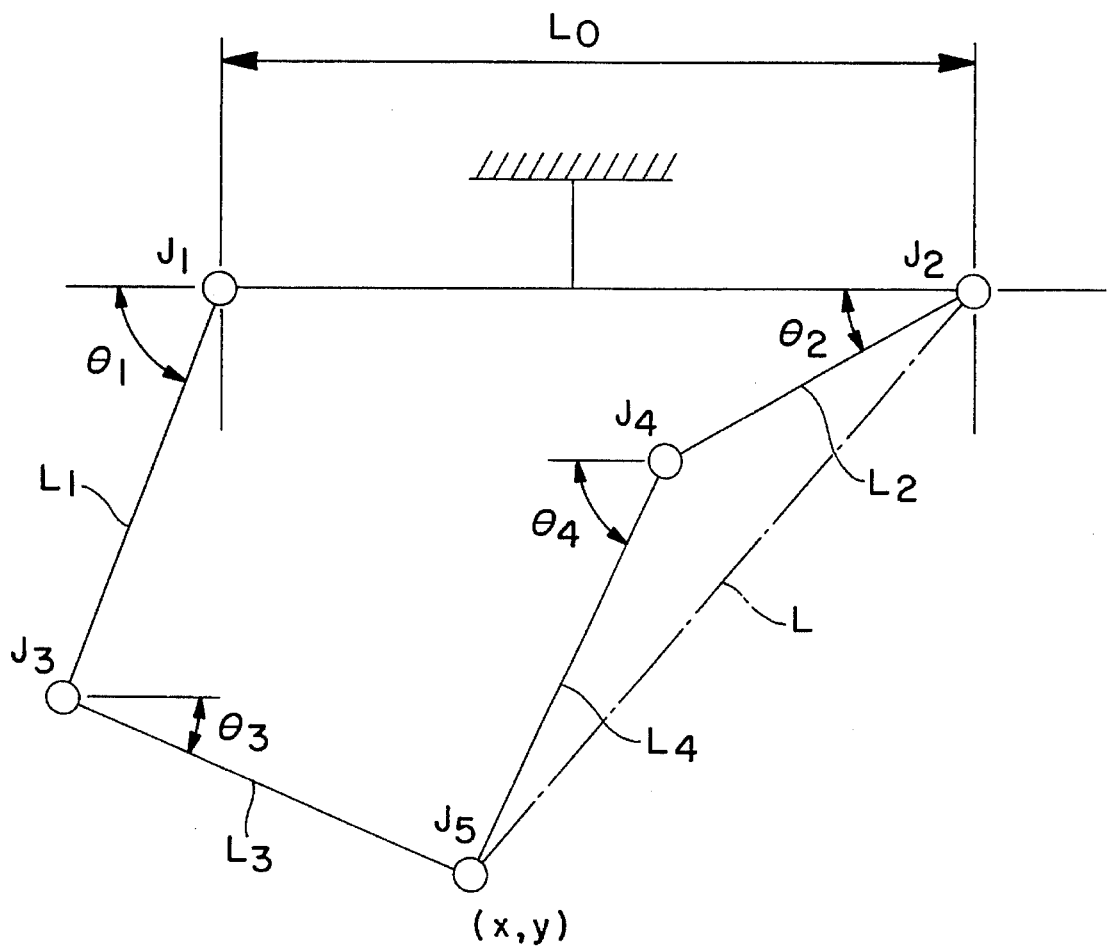
FIG. 4 is a diagram for explaining positional interrelationships between elements constituting the small-locus apparatus of FIG. 3.

FIG. 4 shows data on the aforementioned link structure having five joints, in which L0 designates a distance between the joints J1 and J2, L1 designates a length of the first arm 11 (or a distance between the joints J1 and J3), L2 represents a length of the second arm 12 (or a distance between the joints J2 and J4), L3 designates a length of the first link 13 (or a distance between the joints J3 and J5), and L4 designates a length of the second link 14 (or a distance between the joints J4 and J5). Furthermore, let $\theta_1$, $\theta_2$, $\theta_3$, and $\theta_4$ be angles of the first arm 11, the second arm 12, the first link 13, the second link 14, respectively, with respect to a line joining the joints J1 and J2 ($0 \leq \theta_1, \theta_2, \theta_3, \theta \leq \pi$). Thus, assuming that these arms and links lie in X and Y planes orthogonal to each other, and that the Y axis runs parallel with a line joining the joints J1 and J2, and that the joint J1 is located at the origin of the XY coordinates, a position (x, y) of the tool 2 attached to the joint J5 is expressed as follows:

$$x = L1 \sin\theta_1 + L3 \sin\theta_3 \quad (1)$$

$$y = -L1 \cos\theta_1 + L3 \cos\theta_3 \quad (2)$$

Therefore, coordinate values x, y of the tool depend on variables $\theta_1$ and $\theta_3$. However, the angle $\theta_1$ is detectable as the joint J1 is a fixed point, while the angle $\theta_3$ is not directly detectable as the joint J3 is a floating point. However, as will be described later, the angle $\theta_3$ can be detected using another detectable angle $\theta_2$ (which is detectable because the joint J2 is a fixed point) in addition to the angle $\theta_1$. Therefore, a position of the joint J5, that is, a position (X, Y) according to the link structure shown in FIG. 4 can be detected by measuring rotational angles $\theta_1$ and $\theta_2$ of the first and the second arms with respect to a line joining the joints J1 and J2, both of which are fixed points.

Thus, it will now be explained that $\theta_3 = f(\theta_1, \theta_2)$, where the lengths of the first arm 11, the second arm 12, the first link 13, and the second link 14 are the predetermined values L1, L2, L3, and L4, respectively.

First, according to FIG. 4, the following two equations can be derived.

$$L0 + L1 \cos\theta_1 - L2 \cos\theta_2 - L3 \cos\theta_3 - L4 \cos\theta_4 = 0 \quad (3)$$

$$L1 \sin\theta_1 - L2 \sin\theta_2 + L3 \sin\theta_3 - L4 \sin\theta_4 = 0 \quad (4)$$

In this case, let the intermediate joint J4 constantly lie on the side of the joint J1 with respect to a line joining the joints J2 and J5.

Then, transposing a term associated with 4 to the left side results in $$L4 \cos\theta_4 = L0 + L1 \cos\theta_1 - L2 \cos\theta_2 - L3 \cos\theta_3 \quad (5)$$

$$L4 \sin\theta_4 = L1 \sin\theta_1 - L2 \sin\theta_2 + L3 \sin\theta_3 \quad (6)$$

Then, the left side and the right side of the equations (5) and (6) are individually squared, and the results are added together to obtain the following equation.

$$\cos\theta_3(-2L1 \cdot L3 \cos\theta_1 - 2L2 \cdot L3 \cos\theta_2 + 2L0 \cdot L3) + \quad (7)$$

$$\sin\theta_3(-2L1 \cdot L3 \sin\theta_1 + 2L2 \cdot L3 \sin\theta_2) = L0^2 + L1^2 + L2^2 - L4^2 +$$

$$L3^2 + 2L0 \cdot L1 \cos\theta_1 - 2L0 \cdot L2 \cos\theta_2 - 2L1 \cdot L2 \cos(\theta_1 - \theta_2)$$

Since coefficients of $\cos\theta_3$ and $\sin\theta_3$ in the left side of the equation (7) and the right side thereof are predetermined values or measurable values, let Constant A = $2L1 \cdot L3 \cos\theta1 - 2L2 \cdot L3 \cos\theta2 + 2L0 \cdot L3$, Constant B = $-2L1 \cdot L3 \sin\theta1 + 2L2 \cdot L3 \sin\theta2$, and when we let Constant C = right side of the equation, the following expression is obtained.

$$A \cos\theta3 + B \sin\theta3 = C \quad (8)$$

Hence, $$\theta3 = \cos^{-1}[C/(A^2 + B^2)^{1/2}] + \tan^{-1}(B/A) \quad (9)$$

In this manner, the rotational angle θ3 can be found according to the lengths (predetermined values) of the first arm 11, the second arm 12, the first link 13, and the second link 14, respectively, and the rotational angles (measured values) of the first and second arms 11 and 12.

The small-locus machining apparatus 3 having the five-joint link structure is operated independently of the robot body 1. First, the wrist is positioned by the robot body 1 relative to an object to be machined or a workpiece, and then the small-locus machining apparatus is put in motion.

When the first motor M1 and the second motor M2 are actuated by a controller, the first arm 11 and the second arm 12 are rotated through θ1 and θ2, respectively, by way of the first decelerator D1 and the second decelerator D2. Then, the tool 2 is set to a position (x, y) found by the equations (1) and (2), through the first link 13 and the second link 14 coupled to the first arm 11 and the second arm 12, respectively. These actions take place in sequence to effect a small-locus operating.

During these actions, since the first arm 11 and the second arm 12 are rotated through the decelerators D1 and D2, the rotational angle of the output spindle in the decelerator is much smaller than the rotational angle of the motor, so that the interpolation interval can be set finely in the small-locus operation. The first and second motors 11 and 12, as well as the decelerators 13 and 14, are mass-produced and available on the market. Since the driving section does not include any double-rotation parts, there can be accomplished a secure sealing structure by using an ordinary O ring or oil seal.

Figure 5:
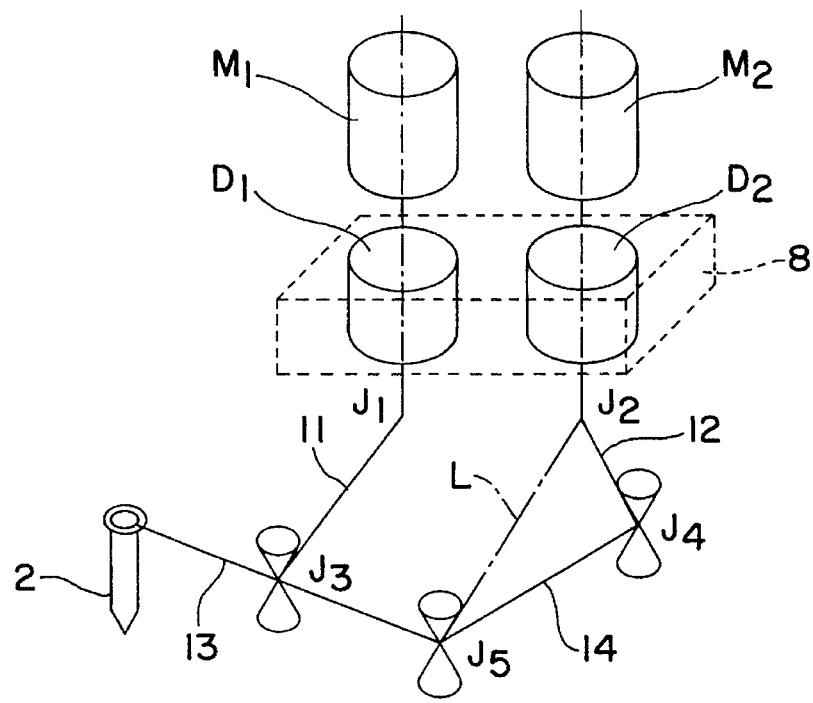
FIG. 5 is a mechanistic diagram schematically showing the mechanism of another embodiment different from that of the small-locus machining apparatus shown in FIG. 3.

FIG. 5 depicts another embodiment of the five-joint link structure, in which the intermediate joint J4 rests on the opposite side to the side on which the joint J1 lies, with respect to a line L joining the second joint J2 and the fifth joint J5, that is, outside the line L. In the same way as explained in reference to FIG. 4, there can be found a rotational angle of the first link 13 with respect to the line joining the joints J1 and J2. In the case of the embodiment of this five-joint link structure shown in FIG. 5, the link structure is somewhat larger than that shown in FIG. 4 due to the outwardly protruding intermediate joint J4.

Figure 6:
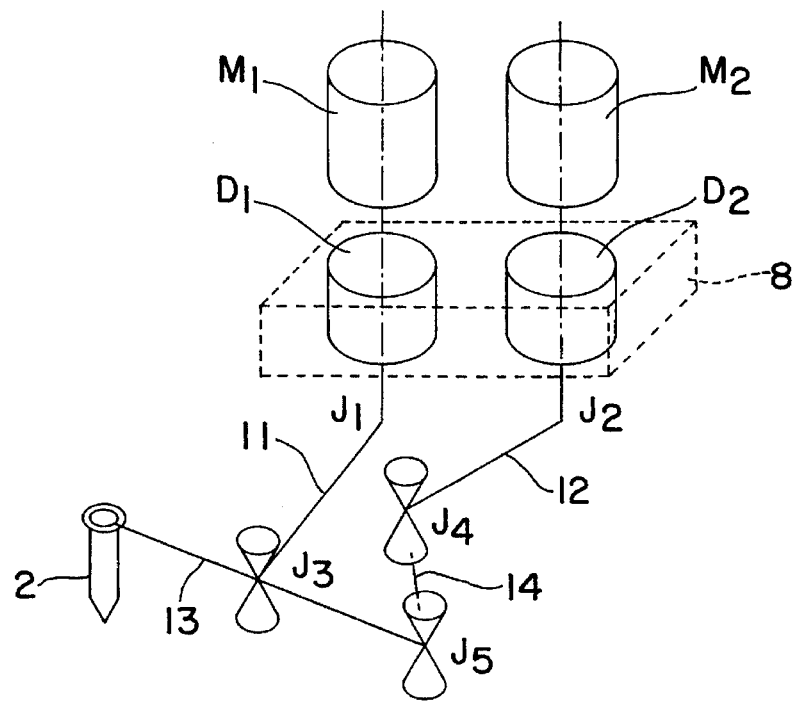
FIG. 6 is a mechanistic diagram schematically showing the mechanism of a further embodiment different from the embodiments of the macro-locus machining apparatus shown in FIGS. 3 and 5.
Figure 7:
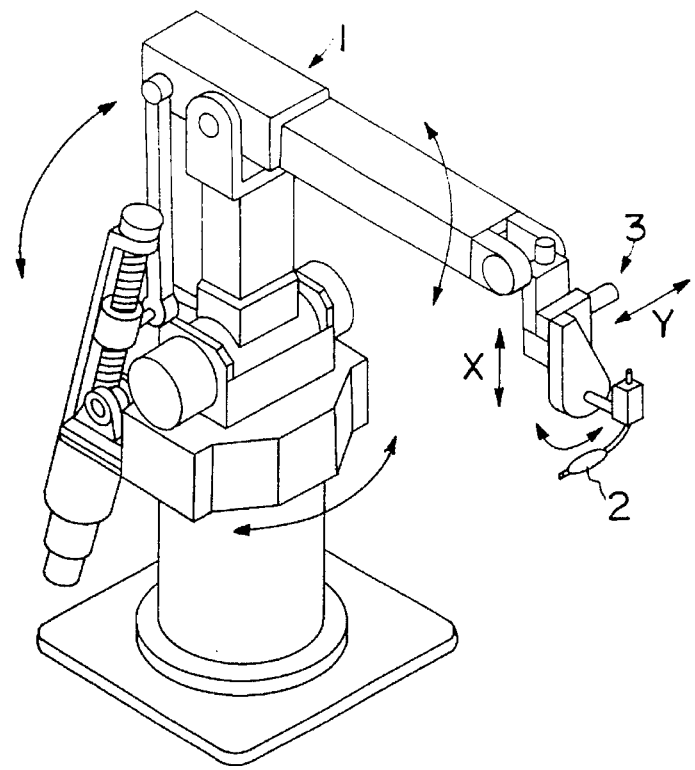
FIG. 7 illustrates a prior art small-locus machining apparatus being attached to the distal end of the robot arm.
Figure 8:
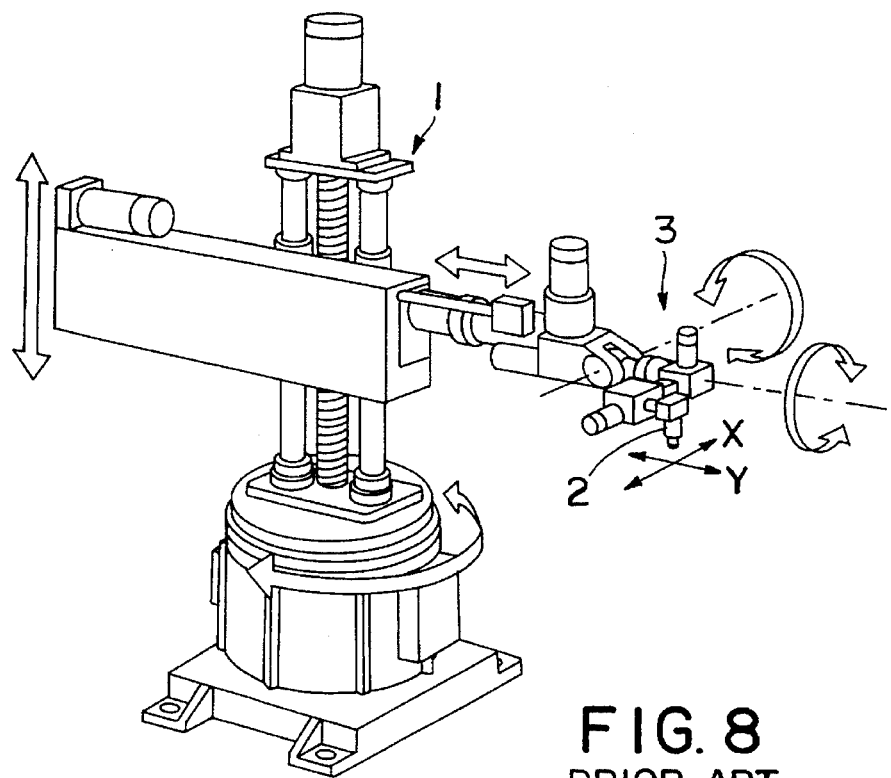
FIG. 8 illustrates another prior art small-locus machining apparatus, having a mechanism different from that shown in FIG. 7, being attached to the distal end of the robot arm.
Figure 9:
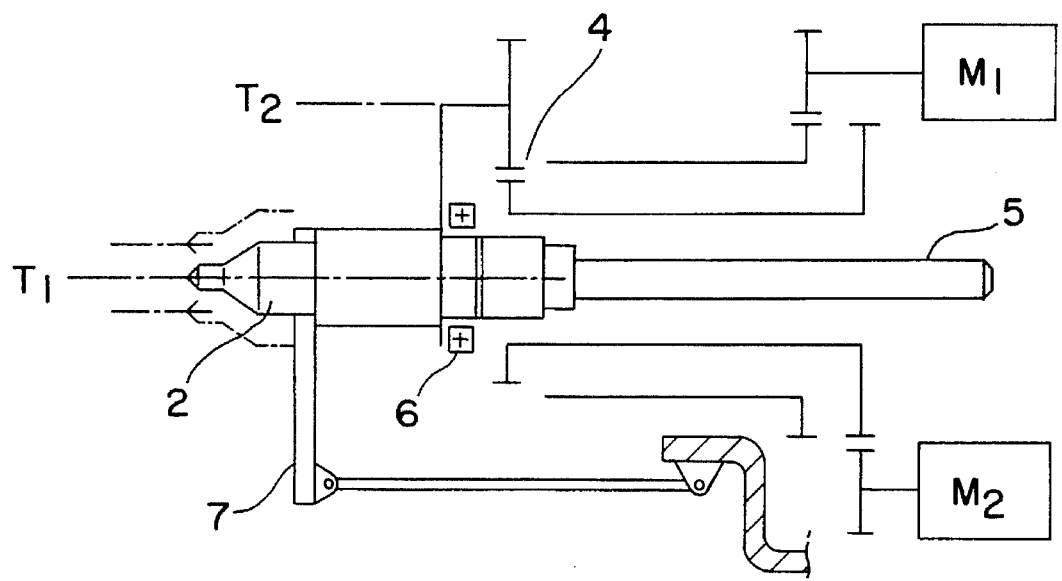
FIG. 9 is a mechanistic diagram for explaining the tool driving operation of the conventional small-locus machining apparatus.
Figure 10:
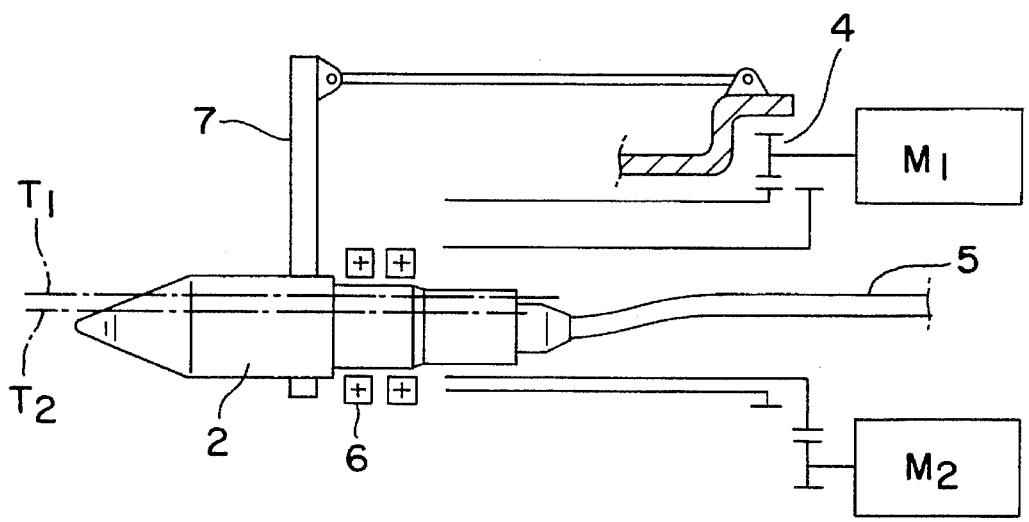
FIG. 10 is a mechanistic diagram for explaining the tool driving operation of the conventional small-locus apparatus by use of a different structure.

Also, it should be understood that the tool 2, in the link structure shown in FIG. 5, can be located at any point on an extended link line obtained by extending any one of the links (for example, the first link) coupled to the joint J5, instead of being positioned on the juncture (or the joint 5) between the first and second links 13 and 14 as shown in FIG. 3. This arrangement ensures that the tool 2 is displaced within a positional range shifted with respect to the base of the small-locus machining apparatus (that is, with respect to the distal end of the robot arm). Naturally, even in the link structure shown in FIG. 3, the tool 2 may be positioned at any point on an extended link line obtained by extending the first link 13 toward the opposite side to the joint J5 beyond the joint J3. Such an example is illustrated in FIG. 6. As described above, the tool 2 may be attached to any position on a line of related links extended beyond a joint connecting the links, without being limited to extension from the intermediate joint 5. Furthermore, even in a case where the tool 2 is attached to any joint, the joint attached to the tool 2 is not restricted to be a specific joint J5 as shown in FIG. 3.

It will be appreciated that the five-joint link structure may be converted into a four-joint link structure if the first joint J1 and second joint J2 are aligned on the same axis to reduce the distance L0 to zero in FIG. 4. The resulting four-joint link structure can also exhibit a function and effect of the present invention without operationally presenting any particular difference. However, such a structure may be inconvenient in that it is somewhat enlarged due to a complicated structure for arranging the first and second drives 9 and 10 on the same axis.

The above description is concerned with an example, in which the small-locus machining apparatus embodying the present invention is attached to the distal end of the wrist of the robot. This small-locus machining apparatus, however, may be used for machining as a single device.

The invention claimed is:

1. A small-locus machining apparatus comprising:

a base;

first and second drives fastened to said base;

first and second rotational arms rotatable about respective first and second axes by said first and second drives, respectively, wherein the first rotational arm includes a base end connected to the first drive, and the second rotational arm includes a base end connected to the second drive and a distal end overlapping the first arm over a portion of a full operational range of movement of said small-locus machining apparatus;

a link structure including three intermediate joints, said structure having two coupling links intervening between said first and second rotational arms so as to form joints for rotatably connecting said rotational arms with said coupling links and for rotatably interconnecting the coupling links;

a member for attaching a tool, said member being located at a point on one link of said link structure or on its extended line;

a detector for detecting rotational amounts of said first and second rotational arms; and a controller for controllably setting said rotational amounts of said first and second rotational arms to predetermined amounts as required.

2. The small-locus machining apparatus according to claim 1, wherein said first and second drives are mounted on said base in such a manner that their respective output axes are parallel to each other, permitting said first and second arms to rotate in planes orthogonal to said respective output axes.

3. The small-locus machining apparatus according to claim 1, wherein:

first and second decelerators are directly connected to said first and second drives, respectively, said first and second decelerators having respective output spindles being secured to the base ends of said first and second arms respectively.

4. The small-locus machining apparatus according to claim 1, wherein either one of said first and second rotational arms in said five-joint link structure is so controlled that a joint connecting a distal end of said one arm to one end of a coupling link always lies on the side of the rotational center of the other rotational arm with respect to a straight line joining the rotational center of said one rotational arm and a joint connecting said coupling link to another coupling link.

5. The small-locus machining apparatus according to claim 1, wherein either one of said first and second rotational arms in said five-joint link structure is so controlled that a joint connecting a distal end of said one arm to one end of a coupling link always lies on the opposite side of the rotational center of the other rotational arm with respect to a straight line joining the rotational center of said one rotational arm and another joint connecting said coupling link to another coupling link.

6. The small-locus machining apparatus according to claim 1, wherein said tool is attached to a joint connecting two coupling links together in such a manner that said tool is secured to one end of one coupling link and is also secured to, through a bearing, one end of the other coupling link.

7. The small-locus machining apparatus according to claim 1, wherein said tool is secured at one of a predetermined position on said coupling link constituting said link structure and a position on an extended link line obtained by extending said coupling link beyond one of said two joints defining both ends of said coupling link.

8. A small-locus machining apparatus, comprising:

a base;

first and second drives fastened to said base along respective first and second axes;

first and second rotational arms rotatable about said first and second axes, respectively, via said first and second drives, wherein the second rotational arm overlaps the first rotational arm over a portion of a full operational range of movement of said small-locus machining apparatus;

a link structure including three intermediate joints, said structure having two coupling links intervening between said first and second rotational arms to form joints for rotatably connecting said rotational arms with said coupling links and rotatably interconnecting the coupling links; and a controller for controlling said first and second rotational arms to rotate to a respective predetermined amount.

9. A small-locus machining apparatus, comprising:

a base;

first and second drives fastened to said base having corresponding first and second axes;

first and second rotational arms having respective first and second base ends and rotatable about respective first and second joints along the first and second axes, wherein the second rotational arm overlaps the first rotational arm over a portion of a full operational range of movement of said small-locus machining apparatus;

a link structure including a third joint connected to a distal end of the first arm;

a fourth joint connected to a distal end of the second arm; and a fifth joint rotationally connected to the third joint with a first link and rotationally connected to the fourth joint with a second link; and a controller which controls the first and second arms such that either one of the third and fourth joints is disposed in closer proximity to the other one of said third and fourth joints than a straight line joining the rotational axis of said link connecting said one joint and said fifth joint.

10. A small-locus machining apparatus, comprising:

first and second drives having corresponding first and second axes;

first and second rotational arms rotatable about respective first and second joints along the first and second axes, wherein the second arm overlaps the first arm over a portion of a full operational range of movement of said small-locus machining apparatus;

a third joint connected to a distal end of the first rotational arm;

a fourth joint connected to a distal end of the second rotational arm; and a fifth joint rotationally connected to the third joint with a first link and rotationally connected to the fourth joint with a second link.

* * * * *

UNITED STATES PATENT AND TRADEMARK OFFICE
CERTIFICATE OF CORRECTION

PATENT NO. : 5,549,018
DATED : August 27, 1996
INVENTOR(S) : Ryo NIHEI, et al.

It is certified that error appears in the above-indentified patent and that said Letters Patent is hereby corrected as shown below:

```
Cover page, item [22], change "Apr. 3, 1993" to --Apr. 30, 1993--
Col. 1,   line 40,   change "a" (second occurrence) to --prior art--
Col. 6,   line 13,   change "θ" to --θ4-- (2nd occurrence)
Col. 7,   line 32,   change "operating" to --operation--;
          after "operation" insert --machining--; and
          line 38, before "operation" insert --machining--
```

Signed and Sealed this

Eleventh Day of February, 1997

Attest:

BRUCE LEHMAN

Attesting Officer     Commissioner of Patents and Trademarks